Figure 1:
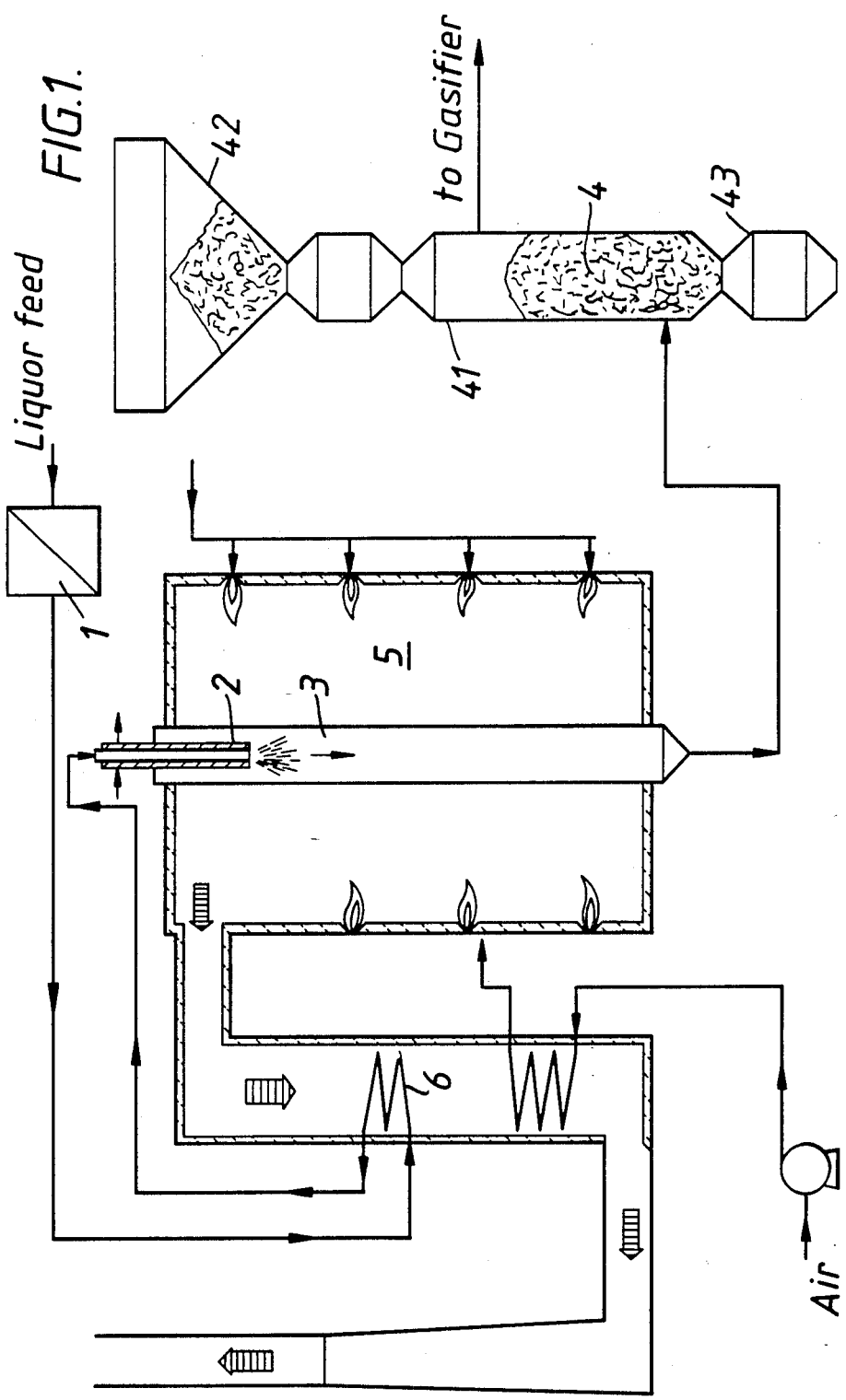

United States Patent [19]

Cleaver et al.

[11] Patent Number: 4,606,830

[45] Date of Patent: Aug. 19, 1986

[54] TREATMENT OF EFFLUENT LIQUORS

[75] Inventors: Brian A. Cleaver, Clifton; Alan F. Ivens, Enfield, both of England

[73] Assignee: British Gas Corporation, England

[21] Appl. No.: 642,847

[22] Filed: Aug. 21, 1984

[30] Foreign Application Priority Data

Aug. 25, 1983 [GB] United Kingdom ................. 8322900

[51] Int. Cl.[4] ............................................. C02F 1/58
[52] U.S. Cl. .................... 210/750; 210/766; 210/774
[58] Field of Search ............... 210/718, 737, 750, 766, 210/774

[56] References Cited

U.S. PATENT DOCUMENTS

| | | | |
|---|---|---|---|
| 2,943,026 | 6/1960 | Pollock et al. | 210/774 X |
| 2,977,292 | 3/1961 | Ellsworth | 210/774 X |
| 3,296,125 | 1/1967 | Hegner | 210/750 |
| 4,045,341 | 8/1977 | Tsuruta et al. | 210/718 X |
| 4,153,556 | 5/1979 | Riedinger | 210/750 X |

Primary Examiner—Thomas Wyse
Attorney, Agent, or Firm—Larson and Taylor

[57] ABSTRACT

Aqueous effluent liquors such as those derived from the ash-slagging of coal are treated to remove halide, e.g. chloride ions by heating the liquor to 400° C. to 500° C. and contacting the vapor with, for example, a fixed or fluidized bed of calcium carbonate maintained at the reaction temperature.

During the heating, the temperature is increased at a rate of at least 50° C. sec$^{-1}$ over the range 100° C. to 300° C. The treated liquor may be used as a reactant in the ash-slagging gasification of coal.

6 Claims, 4 Drawing Figures

TREATMENT OF EFFLUENT LIQUORS

This invention relates to the treatment of aqueous effluents, particularly those derived from the ash-slagging gasification of coal, and to coal gasification processes utilising such treated effluents.

It will be a requirement for coal-based substitute natural gas (SNG) plants that they are equipped with adequate effluent treatment facilities before they are allowed to operate. One of the biggest effluent problems will be the treatment of the condensed liquor from the gas cooling system immediately downstream from the gasifier. This liquor is heavily contaminated with ammonia, hydrogen sulphide, other sulphur containing species, halides, cyanides and organic compounds. It constitutes a totally unacceptable pollution load for direct discharge to sewer.

Conventional treatment schemes for slagging gasifier effluent involving dephenolation, de-ammoniation, biological oxidation and active carbon absorption are capable of reducing most pollutants to levels acceptable for discharge. However, even after this type of treatment, the effluent may still be expected to contain between 5000 mg/l and 25000 mg/l of chloride depending on the coal being gasified. Without substantial dilution, effluent of this salinity could only be discharged to a tidal estuary or to sea at the present time and within a few years it is likely that further restrictions will have been imposed.

One potentially attractive form of disposal is to reinject liquor into the gasifier. This should result in the gasification of any carbon containing species and the substitution of the water present in the liquor for an equivalent amount of process steam. It has in fact been demonstrated that water can be successfully introduced without any apparent difficulty or damage. However, the problem which has to date rendered reinjection infeasible is the build up of chloride in the circulating liquor system.

Chloride enters the gasifier as salts in the coal matrix and appears quantitatively in the liquor as ammonium chloride; none appears in the slag and none as volatile chlorine compounds in the gas. If, therefore, condensed liquor is recycled to extinction in the gasifier the chloride, currently bled to waste via the effluent disposal system, will build up in the liquor until crystallisation takes place resulting in blockages. The high level of chloride present will also produce materials problems in the gasifier. Up to now there has been no process available to remove chloride from the heavily contaminated liquor and thus allow either reinjection or disposal to surface water drain to be practised, except as follows;

(i) Treatment by conventional means, as described above followed by dilution of the product water to reduce halides to an acceptable level and then discharge to a watercourse or sewer, or (ii) Treatment by conventional means followed by a distillation or reverse osmosis stage which would produce a purified water for return to the process and a brine which could be evaporated to dryness giving a solid waste.

A number of factors may affect the viability of either of these approaches.

For example, in the first alternative, the degree of dilution required to lower the chloride concentration in gasifier effluent to an acceptable level renders this approach unattractive, and it is unlikely in any event that the water authorities would permit water to be used for purely dilution pruposes. The dilution factor needed could well be of the order of fifty, giving rise to a requirement for up to 100,000 m$^3$ gallons of water per day for an operational plant (7 Mm$^3$d). This would not only be very expensive but might also cause difficulties with regard to abstraction.

In the second alternative the effluent is treated by conventional means, which may include various combinations of dephenolation, de-ammoniation, biological oxidation, wet air oxidation, active carbon treatment, incineration and reverse osmosis. The clean saline waste water produced is then evaporated to give a solid residue for disposal. The process is technically feasible but will prove to be expensive since it will require not only the capital expenditure associated with complex conventional treatment systems but also a large energy input, which is not readily recoverable, to evaporate the saline waste to dryness.

We have now found that halide can be removed from the effluent, to produce a material suitable for reintroduction as a reactant into the gasifier, by contacting effluent vapour with hot calcium carbonate in a novel and unexpected manner.

Ammonium chloride dissociates to ammonia and hydrogen chloride at temperatures in excess of 275° C. Thus most of the chloride in the gas leaving the gasifier, for example at a temperature of about 480° C. is present as hydrogen chloride. If a bed of basic material, say calcium carbonate, were interposed between the gasifier and the wash-cooler and maintained at gasifier temperature it has been found that chloride can be removed in solid form as calcium chloride whilst allowing the liquor to condense largely chloride free in a form suitable for reinjection.

This third possibility, vapour phase removal of chloride from the gas followed by reinjection of the condensed liquor is, at first sight very attractive. No energy input is required, the cost of limestone for chloride absorption is small, and only one vessel is required making for a fairly low captial cost. However, whilst this represents an elegant solution to the problem of effluent disposal, it was expected that dust and tar in the gas from the gasifier would foul the limestone bed reducing the efficiency of absorption and contaminating the calcium chloride product and making it difficult to dispose of.

We have now found that these problems can be minimised by using a process route in which effluent which has been cooled, condensed and separated from tar, oil and solids is re-vaporised, passed through a bed of hot limestone to remove chloride and reinjected into the gasifier in the form of a highly contaminated steam.

In accordance with the present invention there is provided a process for the treatment of halide containing effluent liquors which comprises heating and vaporising said liquor to a temperature of from 400° C. to 500° C., said heating being effected at a rate of at least 50° C. sec$^{-1}$ over the range 100° C. to 300° C. and thereafter contacting said vapor with calcium carbonate maintained at a temperature of from 400° C. to 500° C.

Mixed tar-free liquors are particularly amenable to treatment in accordance with the invention. The following Table 1 gives an analysis of a tyical crude gasifier liquor separated for the synthesis gas.

TABLE 1

| Composition of Crude Gasifier Liquor (mg/l) | | | |
|---|---|---|---|
| Free Ammonia (as $NH_3$) | 15750 | Thiosulphate | 550 |
| Fixed Ammonia (as $NH_3$) | 3390 | Sulphate | 550 |
| Sodium | 900 | Chloride | 6200 |
| Potassium | 400 | Fluoride | 120 |
| Carbonate (as $CO_2$) | 27950 | Bromide | 115 |
| Cyanide | 8 | Phenols | 6903 |
| Thiocyanate | 1280 | Fatty Acids | 478 |
| Sulphide | 1779 | Other Organics | 471 |

Clearly, when halides are eliminated from the liquor it could be reinjected into the gasifier since the remaining species would be converted to nitrogen, hydrogen sulphide and oxides of carbon.

When liquor is evaporated the salts present in liquor pass through a range of temperatures (approximately 100° C.-300° C.), over which they are stable. Above 300° C. ammonium chloride, the major constituent, rapidly dissociates into ammonia and hydrogen chloride. Any other halides react similarly. Since organic species are volatile, if the temperature of liquor can be raised to 300° C. or above any solid residue will be minimal. This means that in order to be successful the liquor vaporiser will need to raise the temperature of the liquor from 100° C. to 300° C. as rapidly as possible and out of contact with any cool surfaces to avoid the deposition of solid salts. Typically the rate of heating will be within the range 50° C. $sec^{-1}$ to 100° C. $sec^{-1}$.

Although reaction of the halide species is effected at a temperature of from 400° C. to 500° C. it is necessary to impose a heating regamin in that the heating from 100° C. to 300° C. should be as rapid as possible.

The material for the reactor bed may be in any convenient form of calcium carbonate, for example crushed limestone, and the bed itself may be a fixed bed or a fluidised bed. Provision should be made for adding fresh limestone and removing depleted bed particles ie. as calcium chloride.

The invention will be further described with reference to the accompanying drawings which schematically represent different embodiments for heating the liquor to reaction temperature and subsequent reaction with limestone.

In a first embodiment as shown in FIG. 1, filtered liquor typically at a temperature of 25° C. and pumped at a pressure of 30 bar is fed through line 1. The temperature of the liquor is raised to about 90° C. by indirect heat exchange (in unit 6) with flue gases from furnace 5 and sprayed downwardly into the evaporation tube 3 via injector 2. The injector 2 is positioned sufficiently far down tube 3 to ensure that an internal wall temperature of the evaporator can be maintained to at least 300° C. The outlet of the evaporator tube is maintained at from 400° C. to 500° C. The hot effluent vapor is then passed directly to a carbonate reactor 4. Typically the reactor comprises a main body portion 41 wherein the hot effluent vapor is contacted with calcium carbonate. Hopper 42 provides fresh carbonate whereas the spent carbonate (calcium halides) are withdrawn from the bottom of 41 into hopper 43. Both hoppers 42 and 43 may be lock hoppers so that carbonate can be supplied and withdrawn without depressurising the main reactor.

Figure 2:
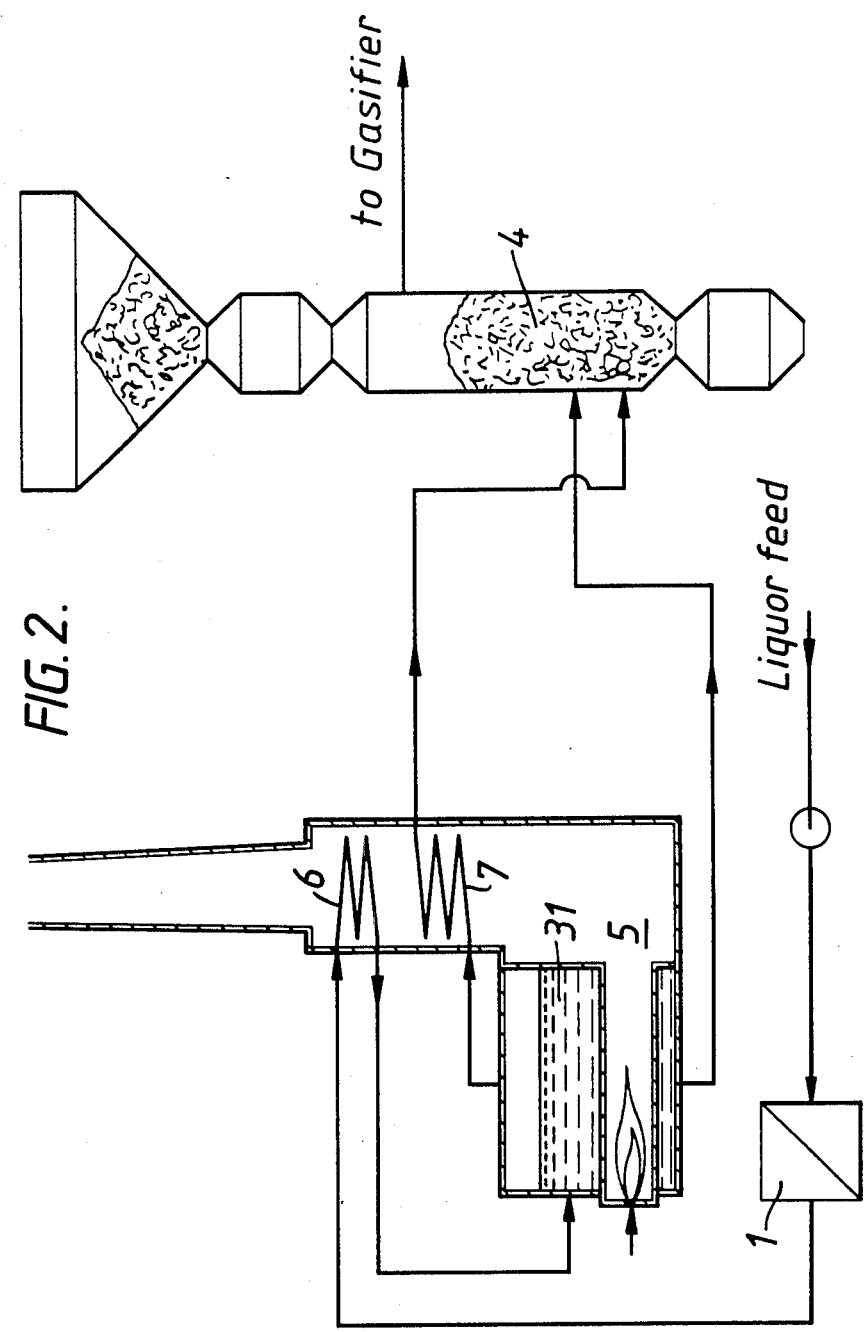
Figure 3:
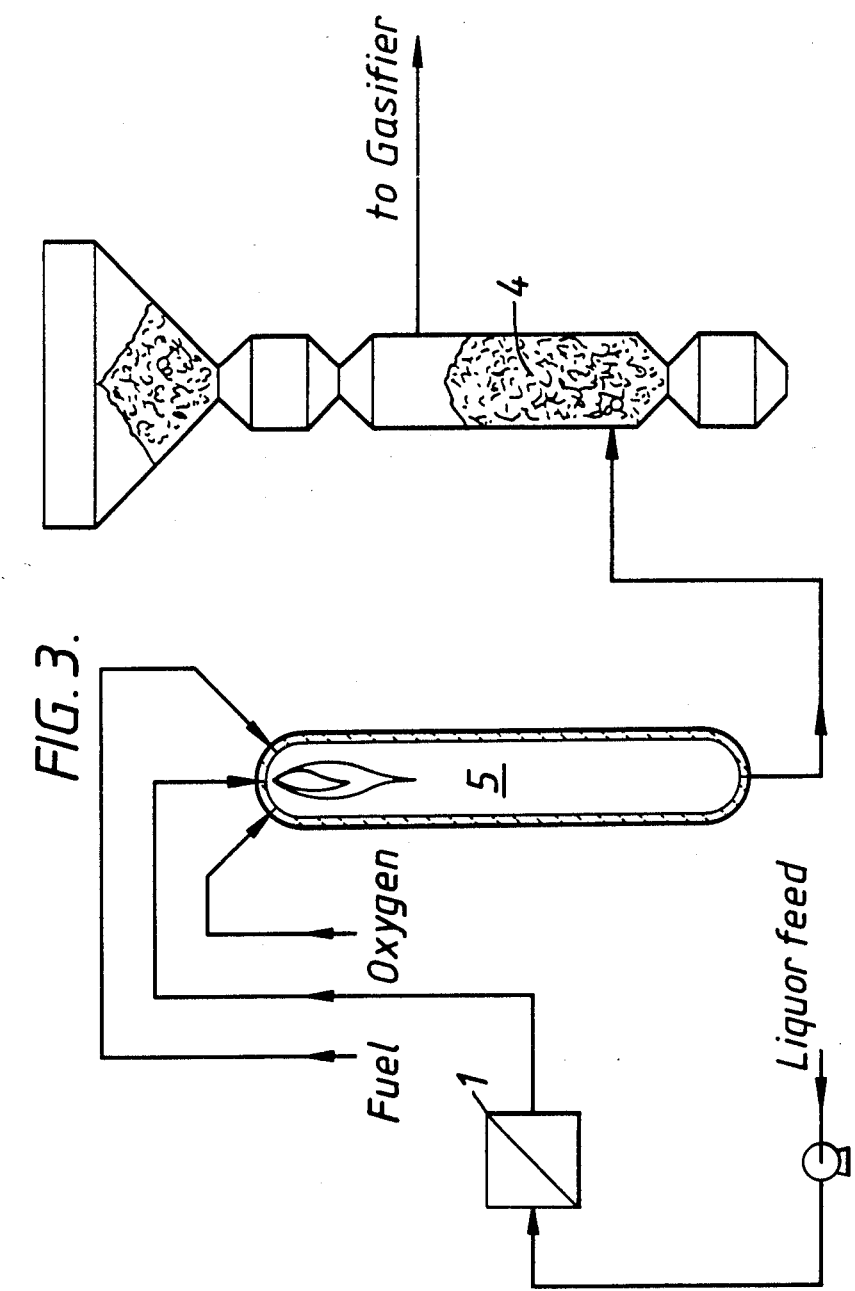

In a second embodiment as shown in FIG. 2, approximately 85% of the liquor is converted into a contaminated vapour by passing liquor through line 1, via heat exchanger 6 situated in the exhaust stack of furnace 5 to a boiler 31. The vapor produced out of boiler 31 is superheated, in heat exchanger 7 to about 550° C. and thereafter reinjected into the bottom of reactor 4. The remaining 15% blowdown from boiler 31 is also injected into reactor 4 but further up than the superheated vapor and is vaporised by the rising vapor.

Figure 4:
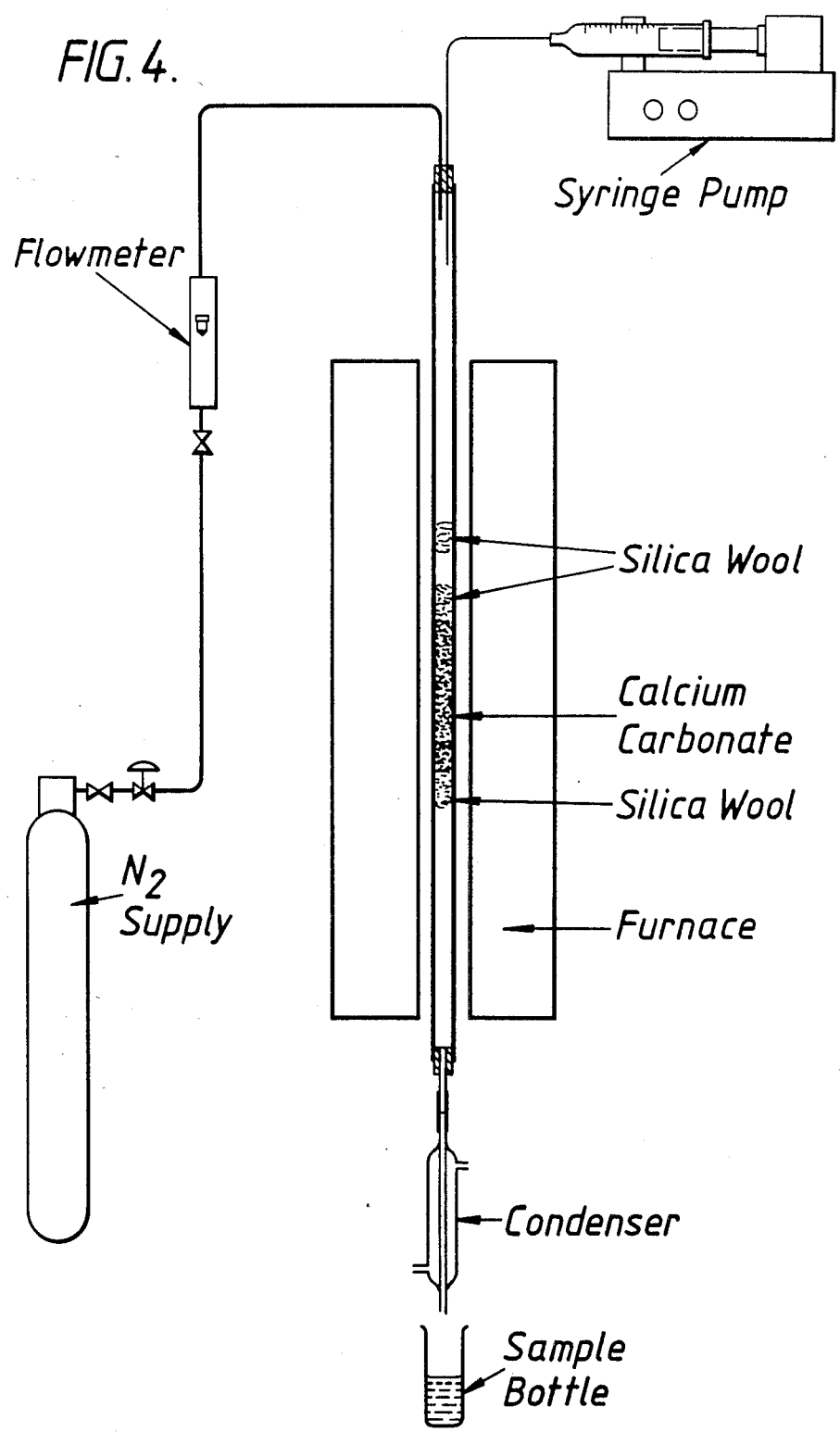

In a third embodiment the liquor is incinerated at high pressure using a fuel/oxygen burner in a combustion chamber. The vaporised liquor and products of combustion at 400°-500° C. are then passed through a limestone bed 4 to remove chlorides and ultimately reinjected into the gasifier. The process is shown in FIG. 4.

In a modification of the this third embodiment, the combustion chamber and the limestone bed reactor may be conbined to form a single integral reaction zone. In this modification it would be preferred to fluidize the limestone bed. Thus, in operation, the chloride-containing liquor would be injected into a hot fluidised bed of limestone together with a variety of fuels, for example tars, oil, fuel gases, coal fines. Within this fluidised bed combuster or incinerator, the chloride would be reacted with the bed material and non-volatile incinerator products such as sulphur and other inorganic constituents would be physically retained on the bed particles.

The invention will be illustrated by the following example. A laboratory testrig was set up as shown in FIG. 4.

The bed consisted of 5 g of calcium carbonate supported between two silica wool plugs. An additional silica wool plug sited 50 mm above the bed provided a vaporising surface for the incoming solution. A flow of 4.8 l/h of nitrogen was maintained down the tube.

46 ml and 80 ml samples of liquors obtained during the ash-slagging gasification of Manvers coal were respectively injected over a period of 280 minutes into the reactor which was maintained at 500° C. Prior to reaction the liquor was analysed by both High Pressure Liquid Chromatography and by Ion Chromatography techniques, as was the condensate obtained after reaction. The analyses are given in the following Table 2.

TABLE 2

| Component | Feed Liquor (mg/l) | Condensate (mg/l) from 1st run | Condensate (mg/l) from 2nd run |
|---|---|---|---|
| Chloride | 6200 | 9 | 50 |
| Fluoride | 120 | 12 | 47 |
| Phosphate | 1 | 12 | 2 |
| Bromide | 115 | 1 | 4.5 |
| Nitrate | 96 | 46 | 0.1 |
| Sulphate | 210 | 47 | 59 |
| Thiocyanate | 1280 | 297 | 284 |
| Thiosulphate | 550 | 296 | 305 |
| Phenol | 3830 | 3800 | 3730 |
| Cresols | 4520 | 4350 | 4240 |
| Xylenols | 860 | 700 | 650 |
| Quinol | 6 | 3 | 1 |
| Resorcinol | 26 | 30 | 20 |
| Catechol | 50 | 10 | 30 |
| Methyl resorcinols | 30 | 1 | 1 |
| Methyl catechols | 40 | 1 | 1 |
| 5,5 Dimethyl hydrantoin | 310 | 300 | 270 |

After reaction the calcium carbonate bed was extracted with water and the extract analysed titrimetrically for chloride and by Ion Chromatography for other ions. The results are given in Table 3.

TABLE 3

| | FIRST RUN | | SECOND RUN | |
| --- | --- | --- | --- | --- |
| Component | Quantity Absorbed (mg) | % of bed | Quantity Absorbed (mg) | % of bed |
| Chloride | 249 | 4.98 | 465 | 9.30 |
| Fluoride | 0.6 | 0.01 | 0.3 | 0.06 |
| Phosphate | 0.3 | 0.01 | 0.8 | 0.02 |
| Bromide | 2.2 | 0.04 | 1.4 | 0.03 |
| Nitrate | 0.20 | 0.010 | 0.10 | 0.01 |
| Sulphate | 20.6 | 0.41 | 5.7 | 0.11 |
| Thiocyanate | 1.3 | 0.03 | 1.3 | 0.03 |
| Thiosulphate | 0.3 | 0.01 | 0.3 | 0.01 |

| | |
| --- | --- |
| Liquor introduced during first run | 46 ml |
| Chloride introduced during first run | 285.2 mg |
| Chloride recovered | 249 mg |
| % recovery | 87.3% |
| Liquor introduced during second run | 80 ml |
| Chloride introduced during second run | 496 mg |
| Chloride recovered | 465 mg |
| % recovery | 93.8% |
| Average recovery | 90.6% |
| Bed temperature during runs | 500° C. |
| Nitrogen flow rate during runs | 4.8 l/h |

The results clearly indicate that at least 90% of chloride is removed by the process and possibly as much as 99% if calculations are based on the reduction of chloride in the liquor. Also bromide and sulphate are substantially reduced by absorption and thiocyanate and thiosulphate decrease, apparently by thermal decomposition since neither an ion is found in the bed after a run. In the main the organic species are unaffected although some thermal degradation of substituted dihydric phenols occurs.

During the course of the tests a number of sulphide determinations were carried out on the calcium carbonate to establish whether this had any absorptive capacity for hydrogen sulphide. No sulphide was found at any time despite the substantial amount present in the feed liquor.

The condensate liquors are suitable for use as a reactant in an ash-slagging gasification process.

We claim:

1. A process for the treatment of halide-containing effluent liquors which comprises heating and vaporising said liquor to a temperature of from 400° C. to 500° C. and contacting said vapor with calcium carbonate maintained at a temperature of from 400° C. to 500° C., characterised in that said heating is effected at a rate of at least 50° C. sec$^{-1}$ over the range 100° C. to 300° C.

2. A process as claimed in claim 1 characterised in that said liquor is derived from the ash-slagging gasification of coal.

3. A process as claimed in claim 2 characterised in that said liquor is first treated to render it substantially tar-free.

4. A process as claimed in claim 1 characterised in that the calcium carbonate is a fixed or fluidised bed of limestone.

5. A process as claimed in claim 1 characterised in that said liquor heating is effected by evaporation or incineration.

6. A process as claimed in claim 1 characterised in that said liquor heating is effected by boiling a major portion of said liquor followed by superheating.

* * * * *